Patented Jan. 13, 1925.

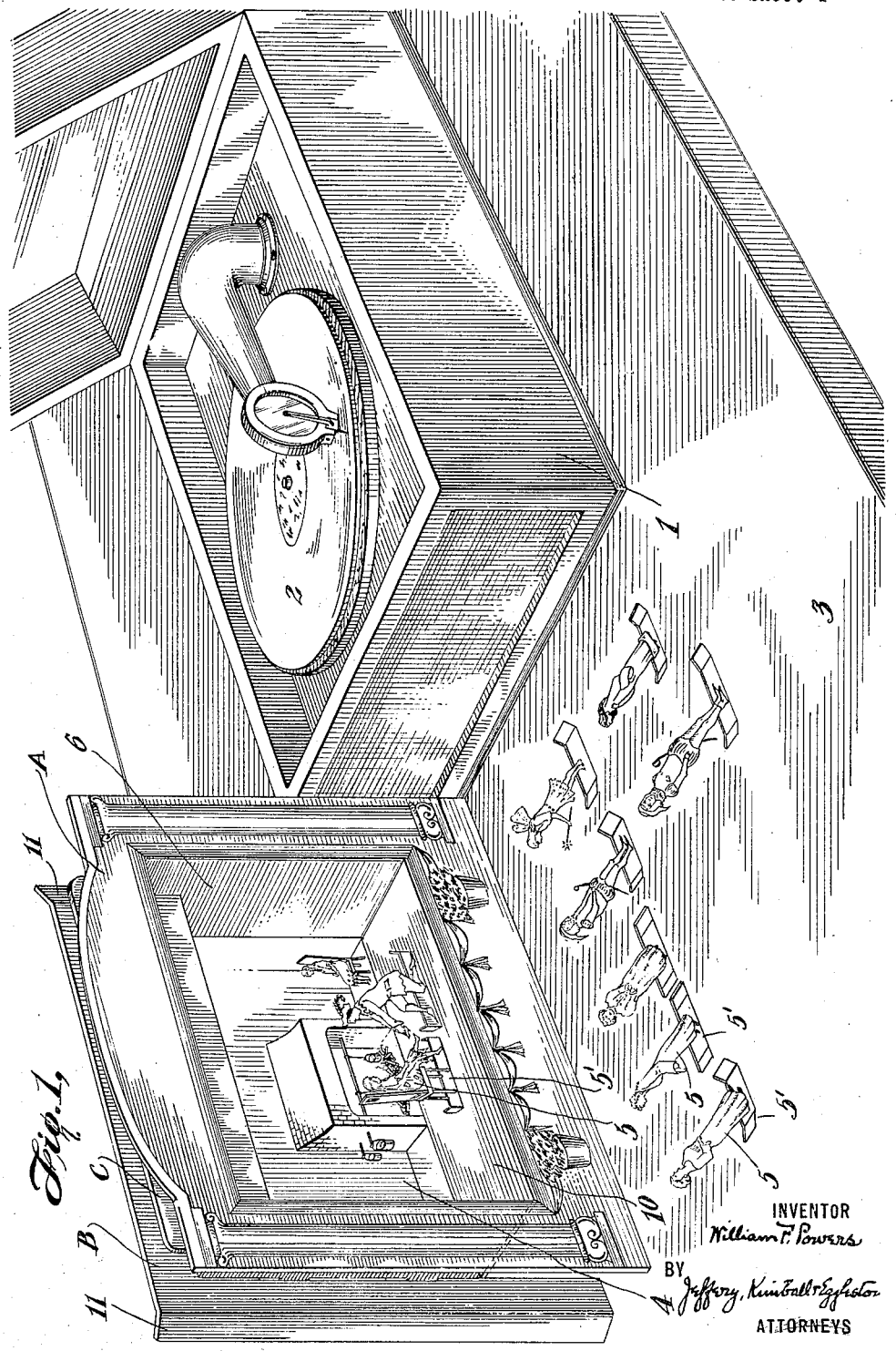

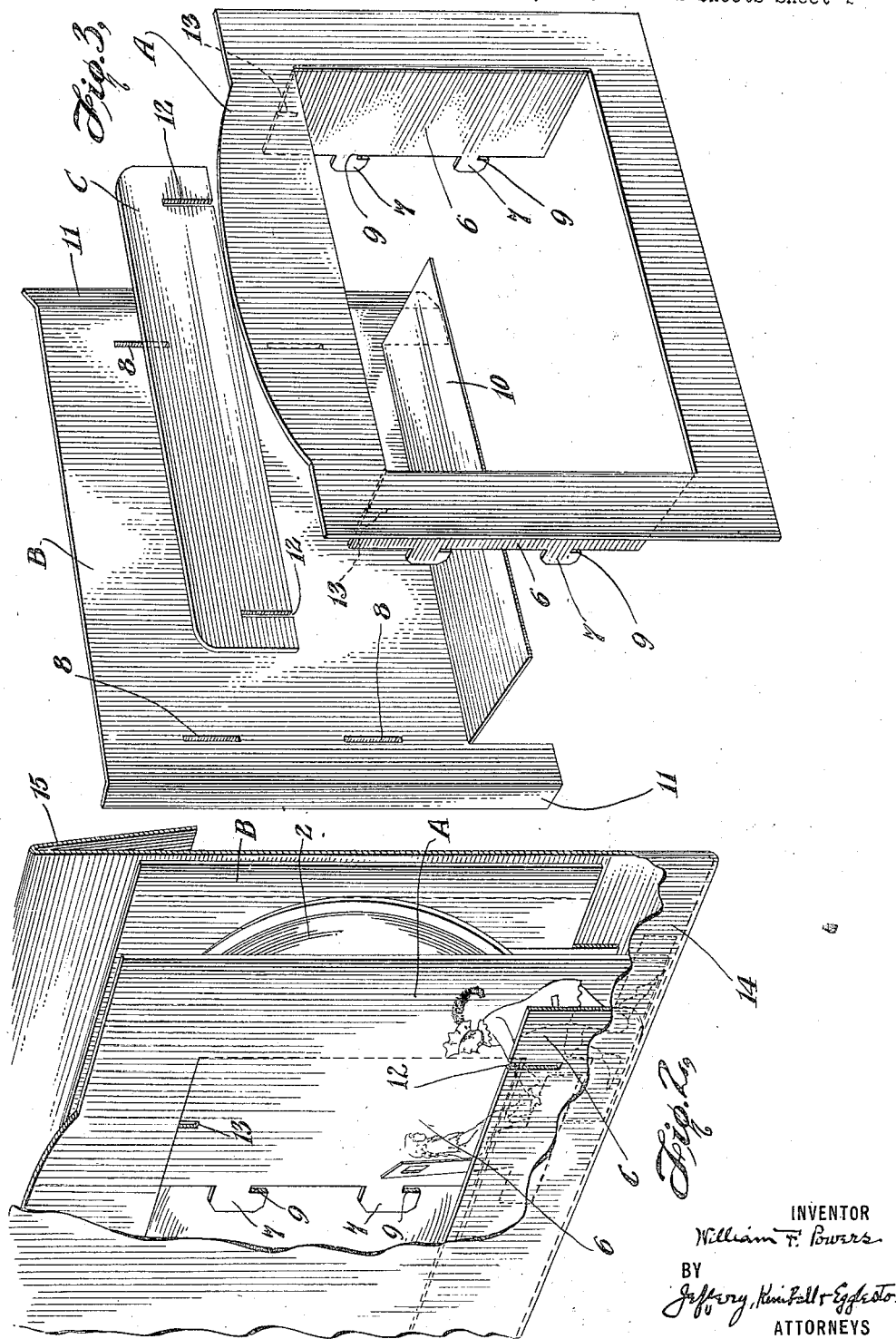

1,523,282

UNITED STATES PATENT OFFICE.

WILLIAM F. POWERS, OF ENGLEWOOD, NEW JERSEY.

THEATRICAL AMUSEMENT, EDUCATIONAL, AND ADVERTISING DEVICE.

Application filed March 25, 1921. Serial No. 455,395.

*To all whom it may concern:*

Be it known that I, WILLIAM F. POWERS, a citizen of the United States, residing in Englewood, county of Bergen, and State of New Jersey, have invented the following new and useful Improvements in Theatrical Amusement, Educational, and Advertising Devices.

My invention consists in a certain combination, hereinafter more fully set forth, of a phonograph record and a miniature knock-down, theatrical stage setting, together with movable or adjustable actor-figures therefor, said stage setting and actor figures bearing pictorial representations, designs or other insignia corresponding to the words and action of the phonograph record, and being made of cardboard of such size and contour as to be capable of compact assembly flatwise with the record in a package of substantially the dimensions now commonly used for the sale and shipment of records, so that the purchaser of such a package can unfold or assemble the stage setting and use the same and the movable actor-figures in demonstration or illustration of the subject of the record to which said setting refers. My invention is thus an educational as well as an amusement device, and it is likewise an effective advertisement device since by its use the seller of phonograph records can offer added inducement to the sale of records in the form of visual portrayal of their respective subject matters. I am of course aware that miniature stage mechanism and actor-figures have heretofore been made and sold, but so far as I am aware, no one has previously proposed to make and correlate such mechanism with a particular theme of a phonograph record and combine the same with its said record in compact commercial package form so as to make thereof a combination that constitutes a sales commodity having educational, recreational and advertisement advantages as above mentioned, and in which the stage setting has a stiffening effect and serves, as to a certain extent the figures do also, as a protection to the record.

The invention further consists in the particular form and assembly of the parts of the stage setting whereby it is specially suited to the combination referred to.

My invention may also be thought of as an amusement, educational and advertising appliance, comprising a phonograph record having recorded thereon for audible indication thereby subject matter susceptible of dramatic representation or illustration, and in combination therewith a visualizer or dramatizer therefor comprising a miniature knock-down stage setting associated therewith and of an appearance appropriate to the said subject matter, and actor-figures associated with said phonograph record and constituting representations illustrative of the said subject matter, whereby to visualize or dramatize the subject matter audibly indicated by the record.

Enjoyment, especially in the case of children, in observing or hearing any dramatic performance, by which I mean the impersonation in representative figures of the characters of any literary or musical work, such as a story, poem, song or play, is greatly increased if they can take part in it. And my invention takes advantage of this fact by making the child the impressario who conducts the performance, placing the characters on the stage setting either before or during the playing of the record and moving them about as the contents of the record may require or as may suit his caprice. The child thus feels himself a part of the performance and his interest and attention are secured.

The range of music, literature and drama through which this means may be applied to increase the usefulness of the phonograph and to delight and at the same time educate the child, is very wide and includes songs, stories, games, poems, lullabies, Christmas carols, fairy tales, and the like, through the long list of the literature which has always appealed especially to children.

As pointed out, I have devised an educational and amusement sales commodity, a compact commercial package, protecting the record by the stiffening and shielding effect of the stage setting and incorporating in common association for cooperative theatrical interpretation, the record or records, the stage setting and the actor-figures above referred to and constituting means of dramatically illustrating the theme orally presented at the same time by the record.

While structural and other details, particularly in connection with the stage setting, are hereinafter described and indeed claimed, it will be understood that the value and importance of the invention are not bound up with such details but that it has the scope indicated in claims which do not specify such details.

Referring to the drawings:

Fig. 1 is a perspective view illustrating the stage setting set up in position for use alongside a phonograph, some of the actor-figures being shown as suitably placed on the stage proper or platform, the said figures and the stage setting being appropriate to the theme of the record.

Fig. 2 is a perspective view of a phonograph record receptacle of ordinary envelope form with the stage setting knocked down, the phonograph record, and the representations of the characters associated therewith enclosed in said envelope, and Fig. 3 is a perspective view of the several members making up the particular stage setting illustrated.

In Fig. 1, the theatrical stage setting made up of the three members A, B, C, is shown side by side with the phonograph 1, which is illustrated as playing the record 2, both being supported by the table top 3. The stage setting which is set up in position for use is appropriate to the theme or contents of the record and is shown as having on its back wall or back drop artistic illustrative matter suggestive of the subject matter of the record, as indicated at 4. This illustrative matter is often of a rather general character especially where it serves as is usually the case for both sides of the record. The front of the stage setting, the wings and the intermediate drop may also be suitably decorated. In the present instance, the theme of the record is Cinderella, and the back drop shows Cinderella in the chimney corner. Of course a scene less specifically illustrative, as one depicting fairies, etc. could be used. A perfectly plain background or one having illustration or decoration of a purely general nature is less interesting. Actor-figures 5, which I make as cutouts, or adapted to be cut out on lines indicated, and which constitute representations of characters or objects associated with the theme or contents of the record are shown in position on the stage and others appear on the table top. They will be at once recognized as Cinderella in her rags and in her ball gown, her stepmother, her two sisters, the fairy, the prince and courtiers. The coach and four and the clock might also be represented. Obviously the number of actor-figures may vary according to the requirements of the subject matter of a given record, but eight such figures for each side of a double record or sixteen in all will usually be sufficient. These figures are provided with means for enabling them to stand up, as for instance, the wing portions 5', which may be bent as indicated for the purpose stated, or the stage platform or figures, or both, may be provided with other means for making it possible to associate them in appropriate relation. It will be understood of course that the illustrative subject matter with which the stage setting is provided, as well as the characters, may vary as widely as the subject matter of the record in whose dramatic interpretation or visual representation the stage setting, figures and record are to co-operate. For example, a stage setting designed to be associated with a record of Mother Goose rhymes or melodies might appropriately have on its back drop an artistic representation of Mother Goose in suitable surroundings, the figures being artistically represented to illustrate the particular Mother Goose rhymes of the record. A great variety of alluring possibilities in this connection will at once occur to anyone familiar with stories, tales, verses, etc. regarded as children's classics.

Furthermore the field from which the maker of phonograph records may select themes for records is by this invention enlarged, since their visual portrayal makes attractive and salable records of subjects—such for instance as bird calls and Bible stories—not otherwise sufficiently interesting to command a ready market. When the stage setting has been set up in position for use adjacent the phonograph and the record put in position on the latter, the figures may be laid out on the table top and some of them may be placed on the stage either before the machine is started, or during the presentation of the record, as this interests the operator even if grown up and especially if a child, since he may, if he pleases, locate the figures on the stage as the presentation of the record goes on and the characters are mentioned and may move them about as called for by the record, or to suit his whim.

The stage setting has a knock-down construction, by which term I mean to include both structures in which the parts of the stage setting are separate, and, when separate flat, and capable of being assembled, and structures in which the stage setting is flat or capable of being folded flat or into set up position. In Fig. 3 it is illustrated as made up of three separate members A, B, C, the member A providing the front arch and containing the stage opening, the member B constituting the back of the stage setting and bearing artistic illustrative matter appearing as the back drop of the stage setting when the various members are in set up position, and the member C forming an intermediate drop between said front and back members. Means are provided for securing the members together releasably, a suitable way of doing this being by the slot and lug connections illustrated. It is convenient and economical of material to provide the front member with flaps 6 constituting originally part of the material which has to be removed to free the stage opening from obstruction and foldable about the side edges of the stage opening. The lines on which these flaps are to be cut and folded may be merely indicated, as indeed may be the outlines of all parts of the stage setting, but I prefer to score the lines of fold and to cut the rest of the flaps free during the manufacture of the stage setting. These flaps in the construction shown in the drawings constitute wings in the stage setting as set up, and they and the back member B are provided with separable and preferably with slot and lug connections, the lugs 7 being illustrated in Fig. 3 as carried by the wings in pairs which correspond with slots 8 in the back member B, the slots being long enough to receive the lugs which are beveled and arranged like pairs of hinge pintles to permit them to be moved down until the necks 9 abut against the bottoms of the slots thus forming a secure but releasable connection. By what has been said, I do not mean to suggest that the flaps need always be vertical or invariably serve as wings. A convenient and economical way of providing the stage proper or platform 10 is to make the back member B with a flap which may be turned about its upper edge, the same being parallel with the lower edge of the stage opening and at substantially the same height. It is convenient but not essential to utilize the lower edge of the stage opening as a means for supporting the free end of the flap 10 constituting the stage. Instead of being cut in advance along the edges which are to be free, this flap like the others may be merely indicated by scored or printed lines for cutting out, where it is thought that the child would be interested in performing this operation for himself. The back member B may have at each side a supporting wing 11. The intermediate drop C is shown as having slots 12 adjacent its ends opening downward for interlocking with correspondingly located slots 13 opening upward in the top edges of the wing flaps 6. The operation of this releasable connection is obvious.

Fig. 2 shows a compact commercial package constituting an educational and amusement sales commodity. In this figure, the outer container 14 is an ordinary phonograph record outer envelope, the flap 15 of which is shown as turned back for convenience and parts of which are broken away to show the contents, which consists of the knockdown theatrical stage setting, the phonograph record of the theme of which the stage setting is suggestive and which is protected thereby, and the actor-figures. Such a sales commodity is unique and has a high degree of utility and practical advantage as above pointed out.

Claims—

1. An amusement, educational and advertising device, consisting in a compact commercial phonograph record package of substantially the dimensions now commonly used for the sale and shipment of records comprising a phonograph record, a miniature theatrical stage setting suited in size for association with a phonograph record in a common package, and actor-figures constituting representations of characters referred to, taking part in or otherwise associated with the theme or contents of the record; said actor-figures being suited in size to the stage setting, and being adapted to be placed individually in appropriate relation thereto, and said stage setting and figures being adapted to be shipped flat with the record and to be set up for use.

2. A compact commercial phonograph record package constituting an educational and amusement sales commodity of substantially the dimensions now commonly used for the sale and shipment of such records and combining a phonograph record, a miniature knock-down theatrical stage setting, appropriate to the theme of said record, and having a record-protecting effect, and movable or adjustable actor-figures constituting representations of characters referred to, taking part in or otherwise associated with the theme or contents of said record and assembled flatwise with the record in said commercial package being adapted by their size and contour to be so assembled, said stage setting and actor-figures bearing pictorial representations, designs or other insignia corresponding to the words and action of the phonograph record and the actor-figures thus being appropriate in appearance and size to the stage setting, which when set up is adapted to receive said figures in suitable relative positions to carry out the theme of the record dramatically.

3. Means for co-operative theatrical display or character representation comprising in combination, a phonograph record, a stage setting and stage properties adapted to be shipped flat and of light material as cardboard, said stage setting being provided with means for supporting it in position of use and said stage properties including figures constituting representations or images of characters associated with the theme of a phonograph record, and adapted to be placed in suitable relation to said stage setting to interpret dramatically the subject matter of said record during or in anticipation of its performance, and both said stage setting and stage properties being suited in size for association with each other and with the phonograph record in a common package of substantially the dimensions now used for the sale and shipment of records.

4. A miniature knock-down theatrical stage setting, comprising a front member and a back member separable therefrom and means for connecting the same to form when set up a stage setting, the front member providing the stage arch and opening and having vertical flaps originally occupying said opening at least in part and designed to be folded back on lines constituting the side edges of the stage opening to free said opening from obstruction and form side walls for the stage setting.

5. A miniature knock-down theatrical stage setting comprising a front member and a back member adapted to be shipped flat, the front member being provided with flaps foldable about edges of the stage opening and constituting a part of the substance of the front member adapted to be turned back out of the way to provide an unobstructed stage opening and to serve as elements in the stage setting when set up, and a releasable connection between said front and back members.

6. A miniature knockdown theatrical stage setting comprising a front and a back member, the front member constituting the stage arch and containing the stage opening, and means for releasably securing said members together in set-up relation, one of said members being provided with a hinged flap which in that relation is in rear of the stage opening and constitutes the stage proper or platform.

7. A miniature knock-down theatrical stage setting adapted to be shipped flat and comprising a separate front and back, the front constituting the stage arch and containing the stage opening and having flaps foldable around the side edges of the stage opening to form wings, and the back having near its bottom a flap foldable around its upper edge to form the stage proper or platform, said front and back having separable connections.

8. A miniature knockdown theatrical stage setting adapted to be shipped flat and comprising a separate front and back, the front constituting the stage arch and containing the stage opening and having flaps foldable around the side edges of the stage opening to form wings, and the back having near its bottom a flap foldable around its upper edge and capable of being supported at the front lower edge of the stage opening so as to form the stage proper or platform, said front and back having separable connections.

9. An amusement, educational and advertising appliance, comprising a phonograph record having recorded thereon for audible indication thereby subject matter susceptible of dramatic representation or illustration, in combination with a visualizer or dramatizer therefor comprising a miniature knock-down stage setting associated with said phonograph record and of an appearance appropriate to the subject matter recorded on the phonograph record for audible indication thereby, and actor-figures associated with said phonograph record and constituting representations illustrative of the said subject matter, whereby to visualize or dramatize the subject matter audibly indicated by the record.

10. An amusement, educational and advertising appliance, comprising a phonograph record having recorded thereon for audible indication thereby subject matter susceptible of dramatic representation or illustration, in combination with a visualizer or dramatizer therefor comprising a miniature knock-down stage setting associated with said phonogaph record and bearing representations illustrative of the subject matter recorded on the phonograph record for audible indication thereby, and actor-figures associated with said phonograph record and constituting representations illustrative of the said subject matter, whereby to visualize or dramatize the subject matter audibly indicated by the record.

In testimony whereof, I have signed this specification.

WILLIAM F. POWERS.